(12) United States Patent
Miyatake

(10) Patent No.: US 7,046,443 B2
(45) Date of Patent: May 16, 2006

(54) ANISOTROPIC LIGHT SCATTERING ELEMENT, ANISOTROPIC LIGHT SCATTERING POLARIZING PLATE USING THE SAME, AND IMAGE DISPLAY DEVICE USING THE SAME

(75) Inventor: Minoru Miyatake, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 151 days.

(21) Appl. No.: 10/624,885

(22) Filed: Jul. 23, 2003

(65) Prior Publication Data

US 2004/0125451 A1    Jul. 1, 2004

(30) Foreign Application Priority Data

Jul. 24, 2002  (JP)  ............... 2002-215853

(51) Int. Cl.
*G02B 5/30*  (2006.01)

(52) U.S. Cl. ...................... 359/494; 359/499
(58) Field of Classification Search ............... 359/494, 359/499, 500, 580, 883; 264/1.31, 1.34, 264/1.7; 349/96, 118
See application file for complete search history.

(56) References Cited

U.S. PATENT DOCUMENTS

| | | | |
|---|---|---|---|
| 2,123,902 A | 7/1938 | Land ................................. 88/1 |
| 4,388,453 A | 6/1983 | Finkelmann et al. .......... 528/15 |
| 4,688,900 A | 8/1987 | Doane et al. ................. 350/347 |
| 5,179,456 A * | 1/1993 | Aizawa et al. ............... 349/118 |
| 5,211,877 A | 5/1993 | Andrejewski et al. . 252/299.01 |
| 5,560,864 A | 10/1996 | Goulding ................ 252/299.01 |
| 5,580,950 A | 12/1996 | Harris et al. ................. 528/350 |
| 5,580,964 A | 12/1996 | Berneth et al. .............. 534/607 |
| 5,833,880 A | 11/1998 | Siemensmeyer et al. ...................... 252/299.64 |
| 5,871,665 A | 2/1999 | Coates et al. ........... 252/299.01 |
| 6,217,792 B1 | 4/2001 | Parri et al. .............. 252/299.61 |
| 6,281,956 B1 * | 8/2001 | Ohmuro et al. .............. 349/118 |
| 2001/0004299 A1 * | 6/2001 | Miyatake et al. ........... 359/494 |
| 2002/0008807 A1 * | 1/2002 | Miyatake et al. .............. 349/65 |

FOREIGN PATENT DOCUMENTS

| | | |
|---|---|---|
| DE | 195 04 224 | 8/1995 |
| DE | 44 08 171 | 9/1995 |
| DE | 198 59 584 | 6/2000 |
| EP | 0 066 137 | 12/1982 |
| EP | 0 261 712 | 3/1988 |
| EP | 0 358 208 | 3/1990 |
| EP | 1 116 987 | 7/2001 |
| EP | 1 144 547 | 10/2001 |
| GB | 2 280 445 | 2/1995 |

(Continued)

*Primary Examiner*—Mark A. Robinson
*Assistant Examiner*—Lee Fineman
(74) *Attorney, Agent, or Firm*—Westerman, Hattori Daniels & Adrian LLP

(57) ABSTRACT

The present invention provides an anisotropic light scattering element that is further improved in controlling of the viewing angle and also reduced in the thickness. The anisotropic light scattering element has an anisotropy in the scattering intensity, and includes an anisotropic light scattering layer having an anisotropy in the light scattering intensity depending on the polarization direction of incident linearly polarized light, and a birefringent layer having a phase difference of less than 1/10 wavelength with respect to incident light in a normal direction and a phase difference with respect to incident light in a direction inclined from the normal that is different from the phase difference with respect to incident light in a normal direction. The birefringent layer develops a phase difference with respect to incident light in a direction inclined from the normal.

16 Claims, 3 Drawing Sheets

FOREIGN PATENT DOCUMENTS

| | | |
|---|---|---|
| JP | 64-77001 | 3/1989 |
| JP | 04258923 A * | 9/1992 |
| JP | 6-82777 | 3/1994 |
| JP | 9-274108 | 10/1997 |
| JP | 11-29772 | 2/1999 |
| JP | 11-72620 | 3/1999 |
| JP | 11-174211 | 7/1999 |
| JP | 2000-187105 | 7/2000 |
| JP | 2001-203074 | 7/2001 |
| WO | WO 93/22397 | 11/1993 |
| WO | WO 98/00428 | 1/1998 |
| WO | WO 00/37585 | 6/2000 |

* cited by examiner

ANISOTROPIC LIGHT SCATTERING ELEMENT, ANISOTROPIC LIGHT SCATTERING POLARIZING PLATE USING THE SAME, AND IMAGE DISPLAY DEVICE USING THE SAME

The present application claims priority of Japanese application No. 2002-215853, which is hereby incorporated by reference.

FIELD OF THE INVENTION

The present invention relates to an anisotropic light scattering element having an anisotropy in the light scattering intensity, an anisotropic light scattering polarizing plate using the same, and an image display device using the anisotropic light scattering element or the anisotropic light scattering polarizing plate.

BACKGROUND OF THE INVENTION

For liquid crystal display devices, expansion of viewing angle is a great object for improving display grade, and thus various optical compensation plates have been used for the purpose of optical compensation. One example is a light scattering element for using light scattering. Light scattering denotes a complicated phenomenon including refraction, reflection, interference and diffraction, and it occurs typically when light enters an interface having a refractive index difference. The light scattering element is formed, for example, by forming an irregularity on a surface so as to use difference in the refractive index at an interface between the surface and air, or by dispersing, in a solute, particles or the like having different refractive indices.

Among such light scattering elements, an anisotropic light scattering element having an anisotropy in the light scattering intensity depending on the incidence direction of light can be used for expanding a viewing angle of a liquid crystal display device since the element scatters regions with tone reversal without degrading visibility when viewed from the front.

An example of such anisotropic light scattering elements is prepared by forming a blind-like structure of layers different in the refractive indices by a phase separation so as to generate a diffraction phenomenon and develop an anisotropy of light scattering (see, e.g., JP 64(1989)-77001). However, this anisotropic light scattering element is difficult to put into practical use, since, for example, control of its anisotropy in the scattering is complicated and the thickness of the element will be increased (e.g., several hundreds of μm).

Another example of an anisotropic light scattering layer is prepared by dispersing isotropic particles in a translucent medium having an anisotropy (see, e.g., JP 11(1999)-29772). However, control of the scattering direction is restricted, and thus sufficient optical compensation may not be provided.

SUMMARY OF THE INVENTION

An object of the present invention is to provide an anisotropic light scattering element that has excellent control of viewing angles and reduced thickness.

For achieving the above-mentioned object, an anisotropic light scattering element of the present invention has an anisotropy in its scattering intensity, and includes an anisotropic light scattering layer having an anisotropy in the light scattering intensity depending on the polarization direction of incident linearly polarized light, and a birefringent layer having a phase difference of less than ¹⁄₁₀ wavelength with respect to incident light in the normal direction and a phase difference with respect to incident light in a direction inclined from the normal that is different from the phase difference with respect to incident light in a normal direction. The birefringent layer develops a phase difference with respect to incident light in a direction inclined from the normal.

Conventionally, sufficient optical compensation cannot be provided to some light. For compensating such light by using light scattering, the inventors had an idea that only light having a predetermined azimuth angle and inclination, among linearly polarized light emitted from a liquid crystal display device, will be scattered so as to compensate the light. Furthermore, the inventors found that the particular azimuth angle and inclination of light to be scattered interrelate with orientation axes of liquid crystals, that is, interrelate with an absorption axis of a polarizing plate arranged at the visible side of a liquid crystal cell.

As a result of keen studies, the inventors found that a combination of the above-described birefringent layer and the anisotropic light scattering layer is useful in selectively controlling the polarization directions of light in a specific direction among light emitted from the polarizing plate arranged at the visible side of the liquid crystal cell, and furthermore, the scattering can be controlled in accordance with the polarization direction, resulting in the present invention. In the present invention, a phase difference relates to light having a wavelength of 589 nm, unless indicated otherwise.

As mentioned above, the anisotropic light scattering element of the present invention is useful in expanding a viewing angle of a liquid crystal display device, since the anisotropic light scattering element can scatter light emitted from a liquid crystal display device, when the light is emitted in a certain direction. Moreover, by using the anisotropic light scattering element of the present invention, light having specific azimuth angles and inclinations can be diffused among non-directional light emitted from the display device. As a result, only light of specific azimuth and inclination can be outputted, and this can provide directivity to light emission of organic EL display devices or the like. Furthermore, since the thickness of the anisotropic light scattering elements of the present invention can be reduced in comparison with conventional ones, thickness of the image display devices can be reduced as well.

DETAILED DESCRIPTION OF THE INVENTION

Figure 1A:
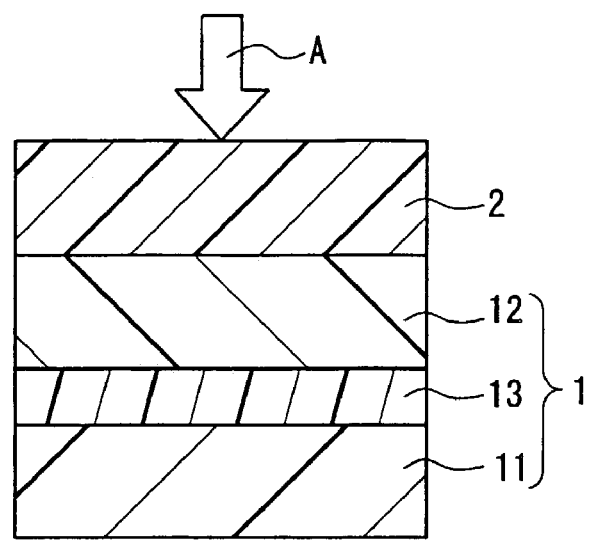
FIGS. 1A and 1B show an example of combinations of an anisotropic light scattering element of the present invention and a polarizer.

As mentioned above, the anisotropic light scattering element of the present invention has an anisotropy in its scattering intensity, and includes an anisotropic light scattering layer having an anisotropy in the light scattering intensity depending on the polarization direction of incident linearly polarized light, and a birefringent layer having a phase difference of less than 1/10 wavelength with respect to incident light in the normal direction and a phase difference with respect to incident light in a direction inclined from the normal that is different from the phase difference with respect to incident light in a normal direction. The birefringent layer develops a phase difference with respect to incident light in a direction inclined from the normal.

The anisotropic light scattering layer will not be limited specifically as long as it has an anisotropy in the light scattering intensity depending on the polarizing direction of incident linearly polarized light. For example, the anisotropic light scattering layer has in the plane a maximum transmission direction in which the linearly polarized light presents a maximum transmittance and a maximum scattering direction in which the linearly polarized light presents a maximum light scattering intensity, and these two directions are orthogonal to each other.

The above-mentioned anisotropic light scattering layer includes, for example, a translucent first region and a second region distinguished from the first region by the birefringence, and the second region is dispersed in the first region.

In the anisotropic light scattering layer, it is preferable as mentioned above that the maximum transmission direction and the maximum scattering direction are orthogonal to each other. For this reason, it is preferable that, on the interface between the first region and the second region, the refractive indices of the regions with respect to the polarization direction of any of the linearly polarized light correspond substantially to each other. When the refractive indices of the regions correspond to each other, for example, light in the polarization direction will pass through the anisotropic light scattering layer while light in the other directions will be scattered.

Specifically, it is preferable in the anisotropic light scattering layer that Δn1 is from 0.03 to 0.50, more preferably from 0.04 to 0.40, and further preferably from 0.05 to 0.30, while Δn2 is less than 0.03, more preferably substantial zero, and, and further preferably zero. Here, Δn1 denotes an absolute value of a difference between the refractive index of the first region and the refractive index of the second region in the maximum scattering direction in the anisotropic light scattering layer, and Δn2 denotes an absolute value of a difference between the refractive index of the first region and the refractive index of the second region in the maximum transmission direction. By determining the differences in the refractive indices as mentioned above, the anisotropic light scattering layer can have sufficiently excellent straight transmission of light and sustention of the polarized state in the maximum transmission direction, and also a sufficiently excellent scattering property in the maximum scattering direction. Here, straight transmission of light denotes a property that incident light passes through a substance without changing its traveling direction. The excellency in straight transmission of light indicates that most of the light after transmission is included in the angle range of ±2.5° from the direction of the incident light.

From an aspect of homogeneity of the scattering effect or the like, it is preferable that second regions are dispersed and distributed as homogeneously as possible in the first region. The dimensions of the second region, especially the length in the maximum scattering direction, have a relationship with back scattering (reflection of the scattered light, the wavelength dependence or the like. Therefore, from an aspect of improving the efficiency in light utilization, prevention of coloring caused by the wavelength dependence, prevention of the recognition of the second regions that degrades clarity in the display, film formation and strength, the length in the Δn1 direction in the second region is preferably from 0.05 μM to 500 μm, and more preferably from 0.1 μm to 250 μm, and further preferably from 1 μm to 100 μm. Typically, the second regions of a domain status exist in the anisotropic light scattering layer, though the length in the maximum transmission direction is not limited specifically. Here, the domain status indicates that respective second regions exist independently like islands in a matrix.

The proportion of the second regions m the anisotropic light scattering layer can be decided suitably from an aspect of dispersion or the like in the maximum scattering direction. When considering the film strength or the like as well, it is in general from 0.1 wt % to 70 wt %, preferably from 0.5 wt % to 50 wt %, and more preferably from 1 wt % to 30 wt %.

Though there is no specific limitation about the materials for the anisotropic light scattering layer, for example, combinations of materials that will be phase-separated from each other are preferred from an aspect of dispersion and distribution or the like of the second regions. Examples of materials for the first region include translucent polymers and materials for the second region include liquid crystals.

The translucent polymers described as materials of the first region are not limited specifically. The examples include polyester-based polymers such as polyethylene terephthalate and polyethylene naphthalate; styrene-based polymers such as polystyrene and acrylonitrile-styrene copolymer (AS resin); olefin-based polymers such as polyethylene, polypropylene, polyolefin that is cyclo-based or having a norbornene structure, and an ethylene-propylene copolymer; carbonate-based polymers; acrylic polymers such as polymethyl methacrylate; vinyl chloride-based polymers; cellulosic polymers such as cellulose diacetate and cellulose triacetate; amide-based polymers such as nylon and aromatic polyamide; imide-based polymers; polyethersulfone-based polymers; polyetherketone-based polymers; polyphenylene sulfide-based polymers; vinyl alcohol-based polymers; vinylidene chloride-based polymers; vinyl butyral-based polymers; arylate-based polymers; polyoxymethylene-based polymers; and mixtures thereof. Among them, preferred polymers are polyethylene terephthalate, polyethylene naphthalate, polycarbonate, cyclo-olefins, norbornene-based olefin, and polyvinyl alcohol. Further preferred polymers are polycarbonate, norbornene-based olefin, and polyvinyl alcohol.

The liquid crystals described as materials of the second regions are not limited specifically. The examples include monomers of low molecular weight liquid crystals and/or crosslinked liquid crystals based on cyanobiphenyl, cyanophenyl cyclohexane, cyanophenyl ester, phenyl ester benzoate, phenylpyrimidine; liquid crystal polymers; or mixtures thereof. These liquid crystals preferably present either a nematic phase or a smectic phase at room temperature or high temperature. A specific example of the liquid crystals is a thermoplastic side-chain type liquid crystal polymer represented by the formula (1).

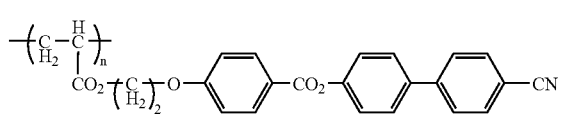 (1)

Materials for the first and second regions are not limited to the above examples. For example, the first region and the second regions can be composed of an isotropic polymer and an anisotropic polymer respectively, and vice versa. Alternatively, both the first region and the second regions can be composed of an anisotropic polymer(s).

Conventionally-known methods can be carried out for producing the anisotropic light scattering layer without any specific limitations. For example, when the translucent polymer and a nematic liquid crystal polymer are used respectively for the first region and second regions, the following procedure can be performed. First, a mixed solution including the materials for the first and second regions is prepared, and this solution is used to form a film in which the translucent polymer contains the liquid crystal polymer in a dispersed state. Next, the film is heated to a temperature at which the liquid crystal polymer exhibits a nematic phase so as to orient the liquid crystal under the action of an orientating force, then quenching the liquid crystal. The orientation is fixed due to the quenching, thereby an anisotropic light scattering layer is produced.

The film can be formed by any suitable methods such as casting, extrusion, ejection molding, roll forming, and flow expanding. Among them, casting and flow expanding are preferred since the second regions are distributed homogeneously. Example of the force to orientate include a tension provided by stretching the film to a suitable magnification, a shearing force at the time of film formation, an electric field, a magnetic field; combinations thereof, and also any suitable restraining force for allowing orientation of the liquid crystal polymers.

Without being limited to the above-mentioned examples, the anisotropic light scattering layer can be formed, for example, by stretching uniaxially and orienting a PDLC (polymer dispersion liquid crystal) film, stretching uniaxially and orienting a film having a phase separation structure of two types of birefringent materials, and by orienting a liquid crystal material containing isotropic microparticles. An example of such anisotropic light scattering layers is known in general as a scattering type birefringent polarizer. Unlike the usage in the present invention, the scattering type birefringent polarizer is traditionally disposed alone on the backlight side of a liquid crystal display device and used as a brightness enhancement film for improving the brightness. In an organic EL display device, the scattering type birefringent polarizer is used for improving light output efficiency. Such scattering type birefringent polarizers are disclosed in U.S. Pat. No. 2,123,902, No. 4,688,900, JP 11(1999)-072620 A, JP 09(1997)-274108 A, JP 11(1999)-174211 A, JP 2000-187105 A, and JP 2001-203074 A.

Next, in the present invention, the birefringent layer is not limited specifically as long as it has a phase difference of less than $1/10$ wavelength with respect to incident light in a normal direction and a phase difference with respect to incident light in a direction inclined from the normal that is different from the phase difference with respect to incident light in a normal direction. The birefringent layer develops a phase difference with respect to incident light in a direction inclined from the normal.

Specific examples of the birefringent layers have birefringence represented by the following formula (2) or (3). A birefringent layer meeting the formula (2) is regarded in general as a negative C plate, while a birefringent layer meeting the formula (3) is regarded in general as a positive C plate.

$$nx \approx ny > nz \qquad (2)$$

$$nx \approx ny < nz \qquad (3)$$

In each of the above formulas, nx, ny and nz denote respective refractive indices in the X-axis, Y-axis and Z-axis directions in the birefringent layer. The X-axis direction denotes a direction in which the refractive index is maximized in the plane of the birefringent layer. The Y-axis direction denotes a direction perpendicular to the X-axis direction in the plane of the birefringent layer, and the Z-axis direction denotes a thickness direction normal direction) of the birefringent layer and perpendicular to the X-axis direction and the Y-axis direction.

Figure 4:
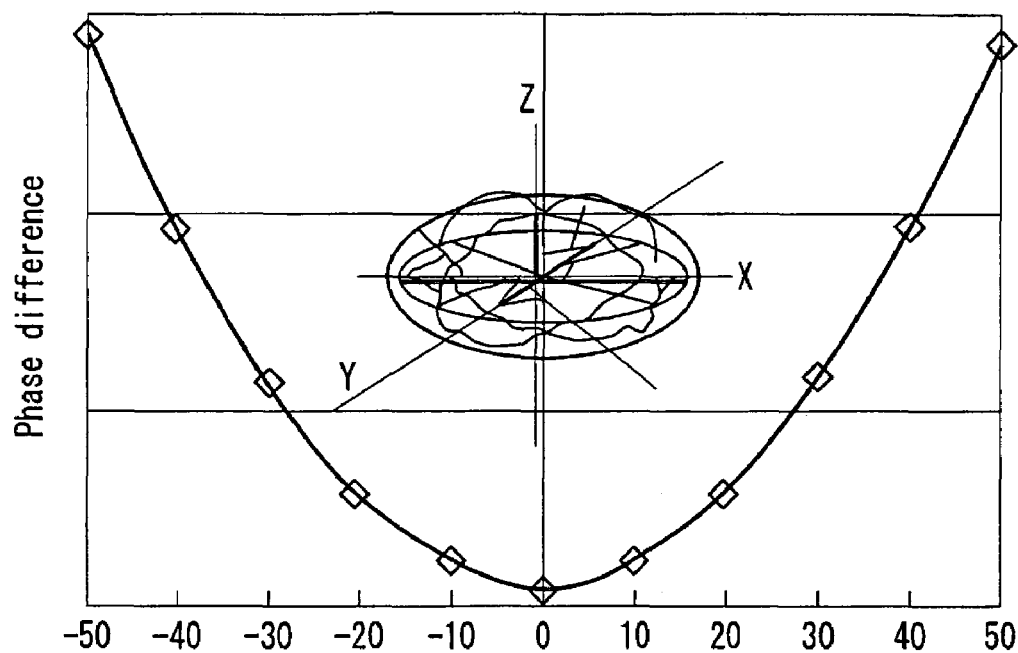
FIG. 4 includes a graph showing an example of an inclination dependence of a phase difference in a birefringent layer used in the present invention, and an example of a refractive index ellipsoid exhibiting the optical anisotropy.

Usually, a birefringent layer having the above-described properties presents a minimum phase difference value with respect to incident light in the normal direction, and in the birefringent layer, a value of the phase difference with respect to the light inclined from the normal (hereinafter, it may be called as inclined light) is increased with the increase in the inclination (absolute value) of the light with respect to the normal. FIG. 4 shows an example between an inclination of incident light and a developed phase difference in the birefringent layer. In FIG. 4, the horizontal axis denotes an inclination (°) and the vertical axis denotes a phase difference developed according to each inclination. An ellipse in FIG. 4 denotes a refractive index ellipsoid indicating an example of optical anisotropy of the birefringent layer. In the examples shown in this drawing, the phase difference at the normal presents a minimum value for the birefringent layer, and the phase difference value is increased with the increase in the inclination (absolute value).

The phase difference with respect to the incident light in the normal direction of the birefringent layer is less than $1/10$ wavelength so as to maintain the incident light in a polarized state. Preferably, it is less than $1/100$ wavelength, more preferably $1/1000$ wavelength, and particularly preferably it is zero.

In the birefringent layer, it is preferable that the phase difference with respect to the inclined light is at least $1/10$ wavelength with respect to incident light having an inclination of 30°. More preferably, it is at least $1/5$ wavelength, further preferably in a range of $1/4$ wavelength to 1 wavelength. The phase difference with respect to the inclined light can be determined suitably, e.g., for the purpose of converting efficiently the polarized state of the incident light in accordance with, for example, angles for scattering or transmission. Specifically, for maximizing the light scattering intensity or for maximizing the transmission intensity of incident light entering the anisotropic light scattering layer at an inclination of 40°, a phase difference in the birefringent layer with respect to the inclined light of an inclination of 40° can be set to be about $1/2$ wavelength. The anisotropic light scattering element of the present invention is characterized by the combination of the birefringent layer and the anisotropic light scattering layer Conventionally known methods can be used for setting the anisotropic light scattering layer to have the above-mentioned birefringence and phase difference. An inclination in the present invention indicates an angle of light in the air. An actual angle in an element follows the Snell's law, and thus it differs from the angle in the air.

The birefringent layer is not limited specifically as long as it has the above-described optical characteristics, and conventionally known layers can be used for this purpose. The layers can be formed, for example, by fixing a planar oriented state of a cholesteric liquid crystal, or by fixing a homeotropic oriented state of a rod-like liquid crystal. Alternatively, columnar orientation or nematic orientation of a discotic liquid crystal can be used. Alternatively, negative uniaxial crystal can be oriented in the plane. Other examples include biaxally stretched and oriented polymer films or the like. Among them, a birefringent layer of the negative C plate represented by the formula (2) is preferred for the convenience in production. Furthermore, a birefringent layer made of a cholesteric liquid crystal is preferred from an aspect of thickness and control of the phase difference.

In the birefringent layer made of the cholesteric liquid crystal, the cholesteric liquid crystal is preferred to have a selective reflection wavelength other than the visible light region (e.g., 380 nm to 780 nm) so as to prevent coloring or the like of the visible light region in the birefringent layer. In general, the selective reflection wavelength is determined uniquely based on a refractive index and a chiral pitch of a liquid crystal molecule having a cholesteric structure. The central wavelength of the selective reflection can exist in the near infrared radiation region. Preferably, it is in the ultraviolet part of not more than 350 nm, since any complicated phenomena caused by the influence of the rotary polarization or the like can be prevented sufficiently. For forming a birefringent layer composed of the cholesteric liquid crystal layer, conventionally known methods can be used without any specific limitation.

The kinds of the cholesteric liquid crystal can be selected suitably without any specific limitation. Examples includes a polymerized liquid crystal formed by polymerizing a liquid crystal monomer, a liquid crystal polymer exhibiting a cholesteric liquid crystal state at high temperature, and a mixture thereof. Though the liquid crystal state of the cholesteric liquid crystal can be either lyotropic or thermotropic, a thermotropic liquid crystal is preferred from an aspect of the convenience in controlling and ease of monodorain formation. Known methods can be used suitably for forming the cholesteric liquid crystal without any specific limitation. Though there is no specific limitation about materials to be used for producing a partially-crosslinked polymer material having a cholesteric liquid crystal state, suitable materials are described in WO00/37585 (Tokuhyo 2002-533742 (published Japanese translation of PCT international publication for patent application)), U.S. Pat. Nos. 5,211,877 (EP 358208), and 4388453 (EP 66137). Alternatively, the cholesteric liquid crystal can be obtained, for example, by mixing either a nematic liquid crystal monomer, a polymeric mesogenic compounds or the like with a chiral agent so as to cause reaction. Though there is no specific limitation, examples of the polymeric mesogenic compounds are described, for example, in WO 93/22397, EP 0261712, DE 19504224, DE 4408171, and GB 2280445. The compounds can be mono-, di-, or multireactive nonchiral/chiral compounds, and the compounds can be synthesized in any known methods. Specific examples of the polymeric mesogenic compounds include LC 242 (trade name) supplied by BASF, UCL-001 (trade name) supplied by DIC, and LC-Sillicon-CC3767 (trade name) supplied by Wacker-Chem Ltd. Though there is no specific limitation, the chiral agent can be synthesized, e.g., by the method described in WO 98/00428. Specific examples of the chiral compounds include non-polymeric chiral compounds such as S101, R811 and CB15 (trade names) supplied by Merck & Co., Ltd., and LC 756 (trade name) supplied by BASF.

A method for producing the birefringent layer including a cholesteric liquid crystal compound is not limited specifically, but conventional methods for forming cholesteric liquid crystal layers can be used suitably. Specifically, for example, a cholesteric liquid crystal compound is coated on a substrate having an alignment film formed on the surface. Alternatively, the substrate can have orientation power in itself. Later, the liquid crystal compound is oriented and the orientation is fixed.

The substrate can be made of materials such as triacetylcellulose or amorphous polyolefins with a smaller birefringent phase difference. A film of polyimide, polyvinyl alcohol, polyester, polyarylate, polyamideimide, or polyetherimide, is formed on the substrate and rubbed with a rayon fabric or the like to provide an alignment film. Alternatively, a $SiO_2$ obliquely deposited layer or the like can be formed on a similar substrate for providing an alignment film. Alternatively, a substrate can be provided with a liquid crystal orientation power by stretching a film of polyethylene terephthalate (PET), polyethylene naphthalate (PEN) or the like. It is also possible to treat the surface of the stretching substrate further with a fine abrasive such as red iron oxide and a rubbing fabric so as to provide fine irregularities having a fine orientating power. Alternatively, the stretching substrate can be provided with an alignment film of an azobenzene compound or the like formed so as to generate a liquid crystal restraining power by photo irradiation.

The following description is about a specific method for forming on the substrate a birefringent layer containing a cholesteric liquid crystal compound. First, a solution of a liquid crystal polymer is coated on the substrate surface having a liquid crystal orientation power, and dried to form a liquid crystal layer. Though there is no specific limitation, examples of the solvent of the solution include: chlorinated solvents such as methylene chloride, trichloroethylene, and tetrachloroethylene; ketone-based solvents such as acetone, methyl ethyl ketone (MEK), and cyclohexane; aromatic solvents such as toluene; cyclic alkanes such as cycloheptane; amide-based solvents such as N-methylpyrrolidone; and ether-based solvents such as tetrahydrofuran. Each of these solvents can be used alone or combined with at least one of other solvents. Similarly, the method of coating is not limited specifically Examples of suitable methods include spin coating, roll coating, flow coating, printing, dip coating, flow expanding, bar-coating, and gravure printing. The solution can be replaced by a heat-melted material of a liquid crystal polymer, or preferably, a heat-melted material presenting an isotropic phase. The heat-melted material is coated in a similar manner, and further expanded as required while maintaining its melting point and solidified. These methods are advantageous from an aspect of providing clean work environment or the like since solvents are not used in the method.

Furthermore, the orientated state of the cholesteric liquid crystal molecules in the liquid crystal layer is fixed to obtain a desired birefringent layer. The fixing method is not limited specifically, but any suitable methods can be selected in accordance with the situation. For example, the liquid crystal layer is heated to a temperature not lower than the glass transition temperature but lower than the isotropic phase transition temperature, then cooled in a state that the liquid crystal polymer molecules are planar-oriented to a temperature lower than the glass transition temperature so as to make glass, thereby the liquid crystal layer is solidified. Alternatively, the structure can be fixed by radiating energy such as ultraviolet rays or ion beams in a stage so that the orientated state is achieved. It is also possible in the process that the liquid crystal polymer is replaced by, or it is used together with, a liquid crystal monomer, oriented and then polymerized by means of heat or irradiation of ionization rays such as electron rays and ultraviolet rays so as to provide a polymerized liquid crystal. In this process, a chiral agent, an orientation auxiliary or the like can be added if required.

When the birefringence of the substrate is small, it is possible, for example, to integrally form the birefringent layer on the substrate, and laminate with a polarizer as mentioned below. For example, when the thickness or birefringence of the substrate may inhibit functions of the polarizer, it is possible in use that either the birefringent layer is peeled off from the substrate, or the retardation layer is transcribed on another substrate.

For a birefringent layer with a fixed state of homeotropic orientation, the type of the homeotropic liquid crystal can be selected suitably without any specific limitations. Examples include a polymerized liquid crystal formed by polymerizing liquid crystal monomers, a liquid crystal polymer exhibiting nematic liquid crystal state, and a mixture thereof. The polymerization liquid crystal can be prepared from a liquid crystal monomer, by adding an orientation auxiliary or the like as required, and then by polymerizing by means of heat or irradiation with ionization rays such as electronic rays and ultraviolet rays. The liquid crystal state can be lyotropic or thermotropic. Considering easy control and monodomain formability, a thermotropic liquid crystal is preferred. Though there is no specific limitation, examples of the liquid crystal monomers include polymeric mesogenic compounds. Though there is no specific limitation about the polymeric mesogenic compounds as well, examples of the above-described cholesteric liquid crystal can be referred to.

Methods for forming such a birefringent layer is not limited, but known methods can be used similar to the case of the cholesteric liquid crystal. The homeotropic orientation can be obtained by, for example, coating on a vertical-alignment film the homeotropic liquid crystal (e.g., long-chain alkylsilane), developing and fixing the liquid crystal state.

Such birefringent layers can be made of discotic liquid crystal materials having negative uniaxiality such as phthalocyanines and triphenylenes having molecules spread in the plane. A nematic phase or a columnar phase is developed and fixed therein. Specific methods will not be limited, but any known methods can be used suitably.

An example of the birefringent layers having negative uniaxial crystal oriented in the plane is described in JP 06(1994)-82777 A or the like, as a birefringent layer comprising a negative uniaxial inorganic layered compound. The inorganic layered compound has unit crystal layers laminated on each other to provide a layered structure. Since the bonding among the unit crystal layers is relatively weak, ions or molecules can be inserted between the unit crystal layers by various physical and chemical methods, without destroying the structure of the unit crystal layers. For this reason, the inorganic layered compound has a nature such that the in-plane refractive index is different from the refractive index in the thickness direction.

Conventionally known methods can be used suitably for forming the birefringent layer using a biaxial orientation of the polymer film, without any specific limitation. Examples include biaxially-stretching a polymer film having a positive refractive index anisotropy, in two directions orthogonal to each other to a substantially same degree; pressing a thermoplastic resin; and clipping a parallel-oriented crystal. When the polymer is a non-liquid crystal polymer, for example, a solution of the polymer is coated on a substrate and dried to form a film, so that the desired birefringent layer can be obtained. Though the non-liquid crystal polymer is not limited specifically, preferred examples include: polyester-based polymers such as polyethylene terephthalate, and polyethylene naphthalate; cellulosic polymers such as diacetyl cellulose, and triacetyl cellulose; acrylic polymers such as polymethyl methacrylate; styrenic polymers such as polystyrene, and acrylonitrile-styrene copolymer (AS resin); polycarbonate-based polymers such as bisphenol A carbonate copolymer; linear/branched polyolefins such as an ethylene-propylene copolymer; polyolefins including a cyclo-structure such as polynorbornene; vinyl chloride-based polymers; amide-based polymers such as nylon, and aromatic polyamide; imide-based polymers; sulfone-based polymers; polyether sulfone-based polymers; polyether ether ketone-based polymers; polyphenylene sulfide-based polymers; vinyl alcohol-based polymers; vinylidene chloride-based polymers; vinyl butyral-based polymers; arylate-based polymers; polyoxymethylene-based polymers; and epoxy polymers. The polymers can be used alone or combined with at least one of other polymers. Furthermore, suitable additives can be added to these polymer materials for providing desired properties such as stretching property and contraction property.

Examples of the non-liquid crystal polymers other than the above-described ones include resin compositions containing thermoplastic resin having substitutional/non-substitutional imide groups in the side chains, and a thermoplastic resin having substitutional/non-substitutional phenyl groups and cyano groups in the side chains. An example of the resin composition comprises an alternating copolymer comprising isobutene and N-methylene maleimide, and an acrylonitrile-styrene copolymer. Regarding the polymide-based films, for example, materials described in U.S. Pat. Nos. 5,580,950 and 5,580,964 can be used suitably for retardation layers comprising non-liquid crystal polymers.

An anisotropic light scattering element of the present invention is obtained by laminating the above-described anisotropic light scattering layer and the birefringent layer. The anisotropic light scattering layer has a thickness, preferably ranging from 10 µm to 200 µm, more preferably from 20 µm to 100 µm, and further preferably from 30 µm to 80 µm. The birefringent layer has a thickness, preferably ranging from 1 µm to 200 µm, more preferably from 2 µm to 50 µm, and further preferably from 3 µm to 10 µm. Consequently, an anisotropic light scattering element of the present invention has a thickness of, preferably not more than 300 µm, more preferably not more than 150 µm, and further preferably not more than 90 µm.

Scattering provided by the anisotropic light scattering element of the present invention can be controlled suitably depending on, for example, a thickness of the anisotropic light scattering layer and combinations of the components. The anisotropic light scattering layer can be provided as a laminate of at least two layers, in view of, for example, securing the light scattering intensity and control of the scattering anisotropy corresponding to the azimuth of the incident light. Similarly in view of its phase difference, the birefringent layer can be provided as a laminate of at least two layers. The birefringent layers to be laminated can be the same or different from each other as long as the above-described conditions are satisfied.

In the anisotropic light scattering element of the present invention, there is no specific limitation about the method of laminating an anisotropic light scattering layer and a birefringent layer, laminating anisotropic light scattering layers, or laminating birefringent layers. For example, a conventionally known method using an adhesive or a pressure-sensitive adhesive can be used.

Figure 5:
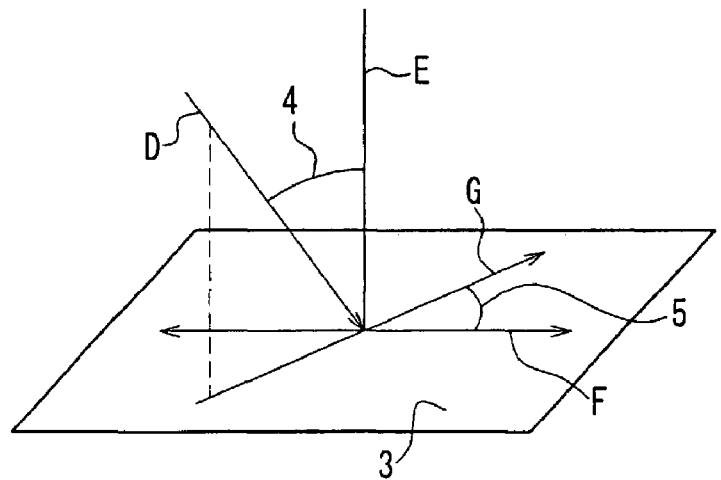
FIG. 5 is a schematic view showing an inclination and an azimuth angle of incident light.

Next, functions of the anisotropic light scattering element of the present invention will be explained by referring to two examples in which the incident light is linearly polarized light. FIG. 5 shows an example of an inclination and an azimuth angle for incident light in the following explanation. As shown in FIG. 5, an inclination 4 of incident light D is an angle formed by the incident light D and a normal E of the incidence surface 3. An azimuth angle 5 denotes an angle formed by a polarization direction F and an incidence direction G of the incident light D when the incident light D is linearly polarized light.

Figure 1B:
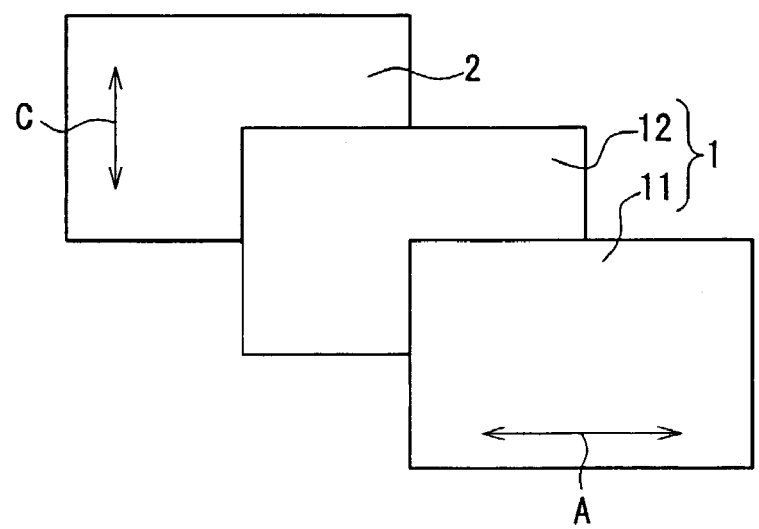

In a first example, a polarization direction of incident light (linearly polarized light) is perpendicular to the maximum scattering direction of the anisotropic light scattering layer, and the linearly polarized light enters the anisotropic light scattering element from the surface provided with a birefringent layer. For allowing the linearly polarized light perpendicular to the maximum scattering direction to enter the anisotropic light scattering element, the anisotropic light scattering element and the polarizing plate can be Laminated, for example, as described below. FIGS. 1(A) and 1(B) are schematic views showing an example of the laminate of the anisotropic light scattering element and the polarizing plate. FIG. 1(A) is a cross-sectional view, and FIG. 1(B) is an exploded view. As shown in FIG. 1(A), the laminate comprises an anisotropic light scattering element 1 formed by laminating an anisotropic light scattering layer 11 and a birefringent layer 12 via an adhesive layer 13 of either a pressure-sensitive adhesive or an adhesive, to which a polarizing plate 2 is laminated further at the side of the birefringent layer 12 on the anisotropic light scattering element 1. Sign 'A' in FIG. 1(A) denotes a direction of irradiation from a light source or the like. As shown in FIG. 1(B), the anisotropic light scattering layer 11 and the polarizing plate 2 are laminated via the birefringent layer 12 so that the maximum scattering direction 'B' of the anisotropic light scattering layer 11 is orthogonal to a transmission axis C of the polarizing plate 2. The adhesive layer 13 is not shown in FIG. 1(B).

When the incident light enters in the normal direction of the anisotropic light scattering element 1 via the polarizing plate 2, the polarized state of the incident light will not change even if the light passes through the birefringent layer 12. Consequently, linearly polarized light that is polarized perpendicular to the maximum scattering direction B, i.e., parallel to the maximum transmission direction, will enter the anisotropic light scattering layer 11. As a result, incident light in the normal direction will pass without any change.

When the incident light is inclined light, a phase difference develops corresponding to the inclination when the light entering the anisotropic light scattering element 1 passes through the birefringent layer 12. This phase difference can change polarization of the incident light, depending on the azimuth angle of the incident light. For example, when the azimuth angle of the incident light is 45°, the polarization direction and a slow axis in the birefringent layer 12 will form an angle of 45°. Therefore for example, when the phase difference developed corresponding to the inclination of the incident light is ½ wavelength, incident light having an azimuth angle of 45° passes through the birefringent layer 12 so as to be converted to linearly polarized light orthogonal to the polarization direction of the incident light. That is, the converted incident light will have polarization direction parallel to the maximum scattering direction B of the anisotropic light scattering layer 11. As a result, the inclined light will be scattered strongly. When the incident light has an azimuth angle of 0° or 90°, the polarization direction of the incident light and the slow axis will be parallel or orthogonal to each other during the transmission of the light through the birefringent layer 12, and the polarized state will not change. As a result, inclined incident light entering in a direction parallel or perpendicular to the polarization will pass through without changing its polarization direction regardless of the inclination.

Figure 2:
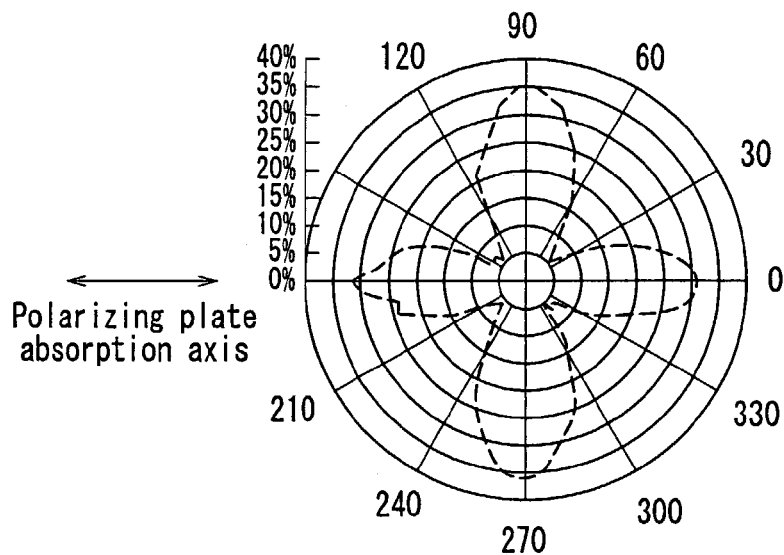
FIG. 2 is a graph showing an example of an azimuth angle dependence of scattering in a case that linearly polarized light having an inclination of 40° enters an anisotropic light scattering element of the present invention.
Figure 3:
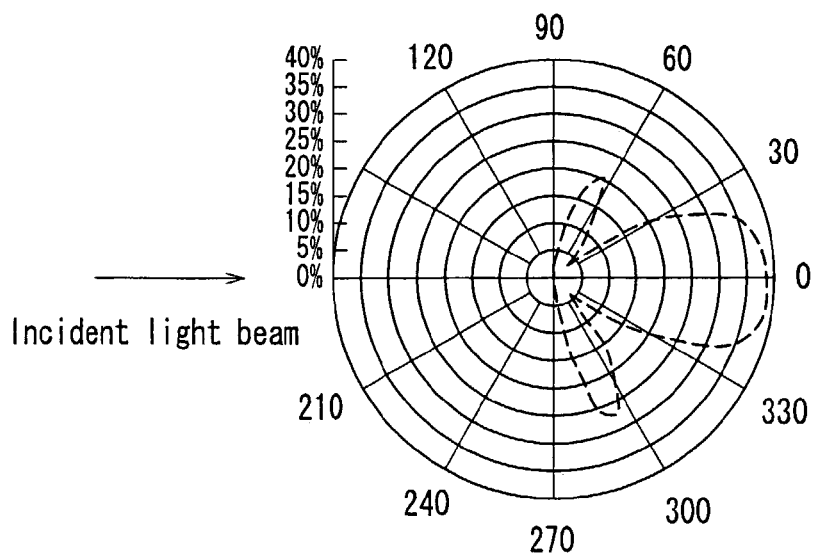
FIG. 3 is a graph showing an example of an inclination dependence of scattering in a case that linearly polarized light having an azimuth angle of 45° enters an anisotropic light scattering element of the present invention.

FIG. 2 shows an example of an azimuth angle dependence of the light scattering intensity of an anisotropic light scattering element of the present invention. The example shown in FIG. 2 is a measurement result of linear transmission intensity in a case that light linearly polarized in a direction perpendicular to the maximum scattering direction 'A' of the anisotropic light scattering layer 11 enters in various directions at an inclination of 40°. In FIG. 2, concentric-circle scales denote the linear transmission intensity. An azimuth angle having a minimum straight transmission intensity corresponds to an azimuth angle having a maximum scattering. The straight transmission intensity was measured by using a transmission measurement unit supplied as a trade name of MCPD-2000 by Otsuka Electrons Co., Ltd. FIG. 3 shows an example of an inclination dependence in the anisotropic light scattering element of the present invention. Specifically, FIG. 3 shows a measurement result for straight transmission intensity for a case that light linearly polarized in a direction perpendicular to the maximum scattering direction 'A' of the anisotropic light scattering layer 11 at various inclinations at an azimuth angle of 45°. In FIG. 3, concentric-circle scales denote the straight transmission intensity. The inclination of 0° corresponds to frontal incident light. In FIG. 3, 45° denotes an azimuth angle at which the scattering in FIG. 2 becomes maximum.

In a second example, a polarization direction of incident light (linearly polarized light) is parallel to the maximum scattering direction of the anisotropic light scattering layer, and the linearly polarized light enters the anisotropic light scattering element from the surface provided with the birefringent layer. For the incident light entering through the vicinity of the front surface of the anisotropic light scattering element, the polarized state of the incident light will not be changed by the transmission through the birefringent layer. As a result, light linearly polarized in a direction parallel to the maximum scattering direction enters the anisotropic light scattering layer, thereby, the incident light from the vicinity of the front surface will be scattered strongly.

In the following case, the incident light is inclined light, having an inclination to develop a phase difference of ½ wavelength and an azimuth angle of 45°. As mentioned above, the incident light, passing through the birefringent layer, is converted to light linearly polarized in a direction orthogonal to the maximum scattering direction, i.e., parallel to the maximum transmission direction. Consequently, the linearly polarized incident light at an inclination with a phase difference of ½ wavelength and an azimuth angle of 45° will pass through the anisotropic light scattering layer without being scattered. For a case of incident light having an azimuth angle of 0° or 90°, the polarization direction and the slow axis of the incident light passing through the birefringent layer will be parallel or orthogonal to each other, causing no change in the polarized state. As a result, inclined incident light in a direction parallel or orthogonal to the polarization direction will be scattered strongly regardless of the inclination.

As mentioned above, an anisotropic light scattering element according to the present invention can provide incident light with a scattering anisotropy depending on the inclination and azimuth angle.

The anisotropic light scattering element of the present invention can be used singly, or it can be laminated with a polarizer so as to form an anisotropic light scattering polarizing plate, since the anisotropic light scattering element of the present invention develops remarkable scattering anisotropy especially when linearly polarized light enters. By laminating a polarizer previously it is possible to obtain incident linearly polarized light most suitable for obtaining preferred scattering and transmission.

An anisotropic light scattering polarizing plate of the present invention will not be limited specifically as long as it includes an anisotropic light scattering element of the present invention and a polarizer. For example, it can be configured by laminating the polarizer on the anisotropic light scattering element, i.e., on the surface provided with a birefringent layer. It is usually preferable that the maximum scattering direction of the anisotropic light scattering layer and the transmission axis direction of the polarizer are substantially orthogonal or substantially parallel to each other.

The polarizer is not limited specifically as long as it emits linearly polarized light, and conventionally known products can be used. Examples include an absorption type polarizing plate using a dichroic pigment or the like, a reflective polarizer using a dielectric multilayer film, a prism polarizer using an angle of polarization, and a scattering polarizer. Furthermore, the polarizer can include suitably a retardation plate and a reflective circularly polarizer using a selective reflection of a cholesteric liquid crystal. Such a polarizer is provided with the retardation plate on the element on the emission surface so as to emit linearly polarized light.

In the anisotropic light scattering polarizing plate of the present invention, the anisotropic light scattering element and the polarizer can be overlaid simply. Preferably however, respective layers are laminated using an adhesive or a pressure-sensitive adhesive from an aspect of workability and efficiency.

Though there is no specific limitation, it is preferable that the adhesive or pressure-sensitive adhesive has no absorption for visible radiation. From an aspect of suppressing surface reflection, the refractive index of the adhesive or pressure-sensitive adhesive is preferably as close as possible to the refractive index of the respective layers. Specifically, an acrylic pressure-sensitive adhesive is preferred for the adhesive or pressure-sensitive adhesive used in the present invention.

As required, particles can be added further to the adhesive or the pressure-sensitive adhesive so as to provide isotropic scattering property and to adjust the diffusion degree. Furthermore, the adhesive or the pressure-sensitive adhesive can include suitably an ultraviolet absorber, an antioxidant, and a surfactant for providing a leveling property during film formation.

The anisotropic light scattering element and the anisotropic light scattering polarizing plate of the present invention can be used preferably for components of various image display devices such as liquid crystal display devices and organic EL display devices. There is no specific limitation about members and the structure of such an image display device as long as the anisotropic light scattering element or an anisotropic light scattering polarizing plate of the present invention are used.

When using an anisotropic light scattering element of the present invention for a liquid crystal display device having a liquid crystal cell with polarizing plates disposed on the both surfaces thereof, for example, it is most advantageous to laminate further the anisotropic light scattering element of a polarizing plate disposed on the visible side of the liquid crystal cell. It is most advantageous to use anisotropic light scattering polarizing plate of the present invention is used as a polarizing plate disposed on the visible side of the liquid crystal cell.

There is no specific limitation about the liquid crystal for forming the liquid crystal display device. The examples include an active matrix driving liquid crystal represented by a thin film transistor, and a simple matrix driving type liquid crystal represented by a twist nematic type and a super twist nematic type.

When optical members other than an anisotropic light scattering element or an anisotropic light scattering polarizing plate are arranged on both surfaces of a liquid crystal panel, the optical members on the surfaces can be the same or different type. Moreover, for forming a liquid crystal display, one or more layers of appropriate members such as a prism array sheet, a lens array sheet, an optical diffuse r and a backlight can be arranged at proper positions.

The following description is about an organic electroluminescent (organic EL) display device of the present invention. In general, the organic EL display device has a ruminant (organic EL ruminant) that is prepared by laminating a transparent electrode, an organic ruminant layer and a metal electrode in a certain order on a transparent substrate. Here, the organic luminant layer is a laminated body of various organic thin films. Known examples thereof include a laminate of a hole injection layer made of triphenylamine or the like and a ruminant layer made of a phosphorous organic solid such as anthracene; a laminate of the ruminant layer and an electron injection layer made of perylene derivative or the like; or a laminate of the hole injection layer, the luminant layer and the electron injection layer.

In general, the organic EL display device emits light on the principle of a system of applying a voltage to the transparent electrode and the metal electrode so as to inject holes and electrons into the organic Ruminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied with a rectification with respect to the applied voltage.

It is preferred for the organic EL display device that at least one of the electrodes is transparent so as to obtain luminescence at the organic luminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag, and Al—Li may be used.

In an organic EL display device configured as described above, the organic ruminant layer is made of a film that is extremely thin such as about 10 nm. Therefore, the organic luminant layer can transmit substantially whole light like the transparent electrode does. As a result, when the layer does not illuminate, incident light from the surface of the transparent substrate and passing through the transparent electrode and the organic luminant layer before being reflected at the metal electrode comes out again to the surface of the transparent substrate. Thereby, the display surface of the organic EL display device looks like a mirror when viewed from the exterior.

The above-described problem can be solved by arranging a polarization plate on the display surface of the transparent electrode and further arranging a retardation plate between the transparent electrode and the polarizing plate. Particularly, the mirror of the metal electrode can be blocked completely by forming the retardation plate with a quarter wavelength plate and adjusting an angle formed by the polarization axis of the polarizing plate and the retardation plate to be $\pi/4$.

As described above, the anisotropic light scattering element of the present invention can be disposed on the visible side of the polarizing plate of an organic EL display device that solves the mirror surface problem caused by a metal electrode. In addition, the anisotropic light scattering polarizing plate of the present invention can be used as a replacement for a polarizing plate of the organic EL display device.

Moreover, an organic EL display device has a problem that an output efficiency of emitted light is low. JP 2001-203074 A or the like discloses an organic EL display device that solves this problem by using the above-described anisotropic light scattering layer. Light emitted from the high brightness organic EL display device has excellent polarization properties. Therefore, the anisotropic light scattering element or the anisotropic light scattering polarizing plate of the present invention can be used for cases of outputting linearly polarized light from the organic EL display device.

EXAMPLE

The present invention is further explained below by referring to the an example and a comparative example, though the present invention is not limited by the example.

Norbornene-based resin supplied as a trade name of Arton by JSR of 950 weight parts (hereinafter, referred to as 'parts') was dissolved in dichloromethane so as to form a 20 wt % solution. Furthermore, 50 parts of crystalline polymer represented by the following chemical formula (1) (average molecular weight is 5000 in terms of polystyrene) was mixed by stirring so as to prepare a mixed solution. This mixed solution was applied by a solvent casting so as to provide a film having a thickness of 70 μm. This film was further stretched three times its original length at 180° C., then quenched to obtain an anisotropic light scattering layer having a thickness of 45 μm. This anisotropic light scattering layer has a refractive index difference $\Delta n1$ of 0.230, and $\Delta n2$ of 0.029.

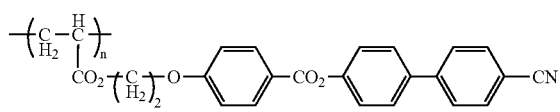

(1)

Next, a coating solution was prepared by blending a commercial photopolymeric nematic liquid crystal monomer, a chiral agent, a photoinitiator and a solvent in a composition of the following Table 1 so that the selective reflection wavelength was 350 μm. This coating solution was coated by using a wire bar on a commercial polyethylene terephthalate (PET) film and dried to obtain a coating film having a thickness of 4 μm. This coating film was heated to an isotropic transition temperature (125° C.) for the liquid crystal monomer, and then, slowly cooled to form a layer having a homogeneously orientated state. The thus obtained layer was irradiated with ultraviolet rays having an accumulative light quantity of 1000 mJ/cm$^2$ so as to fix the orientated state, thereby a birefringent layer was obtained. The phase difference of this birefringent layer was measured with light having a wavelength of 550 nm. The phase difference was 1 nm with respect to incident light in a normal direction, and it was 100 nm (>$\frac{1}{10}$ wavelength) with respect to incident light having an inclination of 30°. The phase difference was $\frac{1}{2}$ wavelength when the inclination was about 45°. The birefringent layer was transcribed by using an acrylic transparent pressure-sensitive adhesive layer having a thickness of 20 μm from the PET to the anisotropic light scattering layer, thereby an anisotropic light scattering element having a thickness of 69 μm was obtained as a laminate of the birefringent layer and the anisotropic light scattering layer.

TABLE 1

| Liquid crystal monomer | Product of BASF AG | Trade name: LC242 | 88 weight parts |
|---|---|---|---|
| Chiral agent | Product of BASF AG | Trade name: LC 756 | 12 weight parts |
| Photoinitiator | Product of Ciba-Geigy Ltd. | Trade name: Irgacure 184 | 5 weight parts |
| Solvent | Toluene | | 400 weight parts |

(Evaluation)

The anisotropic light scattering element obtained in the above example was provided with linear polarized light with varied inclinations, and the scattered state of transmitted light was evaluated visually. The incident light includes incident light having a polarization direction parallel to a maximum scattering direction of the anisotropic light scattering layer, and also incident light having a polarization direction parallel to the maximum transmission direction of the anisotropic light scattering layer. Table 2 shows results for cases of providing the incident light in the normal direction (incidence angle was 0°) and incident light provided at an inclination of 45° and at an azimuth angle of 45° (incidence angle was 45°). In a Comparative Example, the anisotropic light scattering element was replaced by an isotropic scattering element supplied as a trade name of LIGHTUP 100S by KIMOTO.

TABLE 2

| | (Inclination:azimuth) | | |
|---|---|---|---|
| | (0°:0°) | (45°:0°) | (45°:45°) |
| | Polarization direction: maximum scattering direction | | |
| Example | Intensely scattering | Intensely scattering | Substantially transparent |
| Comparative example | Intensely scattering | Intensely scattering | Intensely scattering |

TABLE 2-continued

| | (Inclination:azimuth) | | |
|---|---|---|---|
| | (0°:0°) | (45°:0°) | (45°:45°) |
| Polarization direction: maximum transmission direction | | | |
| Example | Substantially transparent | Substantially transparent | Intensely scattering |
| Comparative example | Intensely scattering | Intensely scattering | Intensely scattering |

As shown in the above Table 2, the isotropic scattering element of the Comparative Example presented intense scattering under any of the incidence conditions. On the contrary, the anisotropic light scattering element of the Example exhibited anisotropy in the scattering in accordance with the polarization direction, inclination and azimuth angle of the incident light (linearly polarized light).

Next, the anisotropic light scattering element obtained in the Example was disposed in a liquid crystal display device including a liquid crystal panel of a vertical mode in a multi-domain orientation. The anisotropic light scattering element was arranged outside a polarizing plate at the visible side of the liquid crystal panel, so that the maximum scattering direction of the anisotropic light scattering layer will be parallel to the absorption axis of the polarizing plate. In a visual evaluation, the tone reversal was sufficiently suppressed for a wide viewing angle in a liquid crystal display device having the anisotropic light scattering element of the present invention. Furthermore, substantially no deterioration was observed in the image quality in the front direction, and no considerable deterioration in the front brightness.

The anisotropic light scattering element of the present invention makes it possible to control scattering, by using an inclination of incident light (linearly polarized light) and an azimuth angle. Therefore for example, by disposing the anisotropic light scattering element of the present invention on the visible side of a liquid crystal display device, light that cannot be optically compensated in a conventional manner can be scattered, and thus the entire visibility can be improved.

Furthermore for example, by applying the anisotropic light scattering element of the present invention onto the visible side of an organic EL display device, light of particular azimuth and inclination can be outputted exclusively, thereby light emitted by the organic EL display device can be provided with directivity.

As described above, the anisotropic light scattering element of the present invention is useful for controlling viewing angles of various types of image display devices.

Furthermore, the anisotropic light scattering element of the present invention, which can be reduced in the thickness, is useful in reducing the thickness of image display devices.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

What is claimed is:

1. An anisotropic light scattering element having an anisotropy in light scattering intensity, comprising:

an anisotropic light scattering layer having an anisotropy in light scattering intensity depending on a polarization direction of incident linearly polarized light, and a birefringent layer having a phase difference of less than 1/10 wavelength with respect to incident light in a normal direction, and a phase difference of at least 1/10 wavelength with respect to incident light in a direction inclined by 30° from the normal direction.

2. The anisotropic light scattering element according to claim 1, wherein, in the birefringent layer, the phase difference with respect to the incident light in a normal direction exhibits a minimum and a phase difference value with respect to the light inclined from the normal increases following an increase in absolute value of the inclination of the light.

3. The anisotropic light scattering element according to claim 1, wherein, in the anisotropic light scattering layer, a maximum transmission direction in which the linear polarized light exhibits a maximum transmittance and a maximum scattering direction in which a light scattering intensity of the linearly polarized light is maximized are orthogonal to each other.

4. The anisotropic light scattering element according to claim 1, wherein the anisotropic light scattering layer comprises a first translucent region and a second region distinguished from the first region by the birefringence, and the second region is dispersed in the first region.

5. The anisotropic light scattering element according to claim 4, wherein, in the anisotropic light scattering layer, a difference in absolute value between a refractive index of the first region and a refractive index of the second region in the maximum transmission direction in which the linearly polarized light exhibits the maximum transmittance is less than 0.03, and a difference in absolute value between a refractive index of the first region and a refractive index of the second region in the maximum scattering direction in which the linearly polarized light has maximum light scattering intensity is from 0.03 to 0.50.

6. The anisotropic light scattering element according to claim 1, wherein the birefringent layer satisfies any of the following formulas:

$$nx \approx ny > nz$$

$$nx \approx ny < nz,$$

where nx, ny and nz denote respectively refractive indices in the directions of X-axis, Y-axis, and Z-axis in the birefringent layer; the X-axis direction denotes a direction in which the refractive index is maximized in the plane of the birefringent layer, the Y-axis direction is perpendicular to the X-axis direction in the plane of the birefringent layer, and the Z-axis direction is a thickness direction which is the normal direction of the birefringent layer, and perpendicular to the X-axis and Y-axis.

7. The anisotropic light scattering element according to claim 1, which is disposed on a visible side of a liquid crystal cell.

8. The anisotropic light scattering element according to claim 1, wherein the anisotropic light scattering layer and the birefringent layer are laminated via an adhesive or a pressure-sensitive adhesive.

9. An anisotropic light scattering polarizing plate comprising the anisotropic light scattering element according to claim 1 and a polarizer, wherein the polarizer is laminated on the anisotropic light scattering element so as to face the birefringent layer.

10. The anisotropic light scattering polarizing plate according to claim 9, wherein a maximum scattering direction in which light scattering intensity in the anisotropic light scattering layer of the anisotropic light scattering element is maximized and a transmission axis direction of the polarizer are substantially orthogonal to each other.

11. The anisotropic light scattering polarizing plate according to claim 9, wherein a maximum scattering direction in which light scattering intensity in the anisotropic light scattering layer of the anisotropic light scattering element is maximized and a transmission axis direction of the polarizer are substantially parallel to each other.

12. An image display device comprising a liquid crystal cell, wherein either the anisotropic light scattering element according to claim 1 or the anisotropic light scattering polarizing plate according to claim 9 is disposed on a visible side surface of the liquid crystal cell.

13. An image display device comprising either the anisotropic light scattering element according to claim 1 or the anisotropic light scattering polarizing plate according to claim 9.

14. An organic EL display device comprising either the anisotropic light scattering element according to claim 1 or the anisotropic light scattering polarizing plate according to claim 9.

15. The anisotropic light scattering element according to claim 1, wherein the birefringent layer has a phase difference of at least $\frac{1}{5}$ wavelength with respect to incident light in a direction inclined by 30° from the normal direction.

16. The anisotropic light scattering element according to claim 1, wherein the birefringent layer has a phase difference of from $\frac{1}{4}$ to 1 wavelength with respect to incident light in a direction inclined by 30° from the normal direction.

* * * * *